United States Patent
Maekawa

(10) Patent No.: US 9,288,549 B2
(45) Date of Patent: Mar. 15, 2016

(54) TERMINAL DEVICE

(75) Inventor: Masahide Maekawa, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 70 days.

(21) Appl. No.: 13/223,662

(22) Filed: Sep. 1, 2011

(65) Prior Publication Data

US 2012/0110134 A1     May 3, 2012

(30) Foreign Application Priority Data

Sep. 1, 2010   (JP) .................................. 2010-195987

(51) Int. Cl.
| | |
|---|---|
| *G06F 15/16* | (2006.01) |
| *H04N 21/658* | (2011.01) |
| *H04N 21/442* | (2011.01) |
| *H04N 21/482* | (2011.01) |
| *H04N 21/81* | (2011.01) |

(52) U.S. Cl.
CPC ......... *H04N 21/6581* (2013.01); *H04N 21/442* (2013.01); *H04N 21/4825* (2013.01); *H04N 21/8113* (2013.01)

(58) Field of Classification Search
CPC ............ H04N 21/8113; H04N 21/442; H04N 21/6581; H04N 21/4825
USPC .......................................... 709/231; 370/225
See application file for complete search history.

(56) References Cited

U.S. PATENT DOCUMENTS

| | | | | |
|---|---|---|---|---|
| 4,451,929 A | * | 5/1984 | Yoshida .................. 382/155 | |
| 6,332,140 B1 | * | 12/2001 | Rhine | |
| 6,393,480 B1 | * | 5/2002 | Qin et al. ................... 709/224 | |
| 7,016,970 B2 | * | 3/2006 | Harumoto et al. ............ 709/233 | |
| 2004/0034712 A1 | * | 2/2004 | Rajwan et al. ................ 709/231 | |
| 2005/0223107 A1 | * | 10/2005 | Mine et al. ..................... 709/231 | |
| 2006/0034583 A1 | * | 2/2006 | Shimizu ......................... 386/46 | |
| 2006/0184261 A1 | * | 8/2006 | Ng et al. ......................... 700/94 | |
| 2007/0067812 A1 | * | 3/2007 | Watanabe ....................... 725/90 | |
| 2007/0172205 A1 | * | 7/2007 | Wakatani ....................... 386/95 | |
| 2007/0201549 A1 | * | 8/2007 | Hannuksela et al. ..... 375/240.01 | |
| 2008/0016330 A1 | * | 1/2008 | El-Essawy et al. ........... 712/225 | |
| 2008/0189750 A1 | * | 8/2008 | Yoon et al. .................... 725/105 | |
| 2008/0195695 A1 | | 8/2008 | Tanaka et al. | |
| 2011/0225302 A1 | * | 9/2011 | Park et al. ..................... 709/227 | |

FOREIGN PATENT DOCUMENTS

JP        2006-31394 A    2/2006

* cited by examiner

*Primary Examiner* — Brian J Gillis
*Assistant Examiner* — Juan C Turriate Gastulo
(74) *Attorney, Agent, or Firm* — Crowell & Moring LLP

(57) ABSTRACT

Plural pieces of content are sequentially reproduced, without interruption. A terminal measures a processing time from request for content data of a first tune from a server to decoding of first content data in a streaming format. A reproduction end time of content under reproduction is calculated and a time earlier than the reproduction end time by the processing time is caused to be a request time when content data of a second tune is requested. When the time occurs during reproduction of the first tune, the terminal requests the content data of the second tune from the server. The terminal receives and decodes the content data before the reproduction end time. When the reproduction of the content data of the first tune is ended, the terminal immediately reproduces the content data of the second tune.

4 Claims, 5 Drawing Sheets

Figure 1:
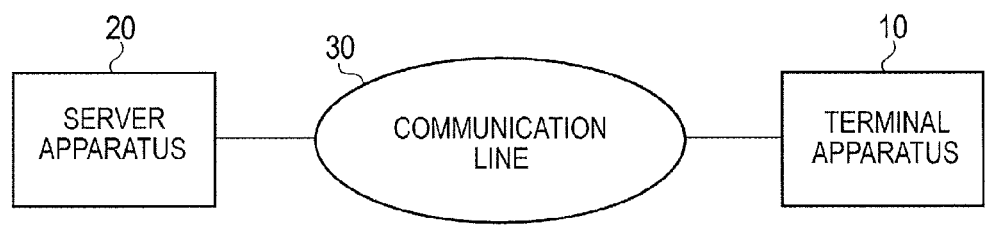

| FILE NAME | TITLE | PLAYER NAME • SINGER NAME | DATA SIZE |
|---|---|---|---|
| sample-1.mp3 | sample-1 | abc | 5MByte |
| sample-2.mp3 | sample-2 | abc | 4.8MByte |
| sample-3.mp3 | sample-3 | abc | 3MByte |
| sample-4.mp3 | sample-4 | abc | 4.1MByte |

FIG.6

| FILE NAME | TITLE | DATA SIZE |
|---|---|---|
| sample-1.mp3 | sample-1 | 5MByte |
| sample-2.mp3 | sample-2 | 4.8MByte |
| sample-4.mp3 | sample-4 | 4.1MByte |

TERMINAL DEVICE

BACKGROUND OF THE INVENTION

1. Field of the Invention

The present invention relates to a technique for acquiring content through a communication line.

2. Description of the Related Art

As a system for transmitting content including audio and video from a server apparatus to a client through a network, there is a content delivery system disclosed in patent document 1. In this system, a delivery request for plural pieces of content is transmitted from the client to the server. When receiving the delivery request, the server transmits the content in a streaming format. The client stores the transmitted content in a buffer, and reproduces the content in the order of storage. Incidentally, the client monitors the remaining amount of the buffer, and periodically notifies the server of the remaining amount. The server controls the transmission speed of the content based on the remaining amount notified from the client. When the transmission of the first content is completed, the server starts to transmit next content.

[Patent Document 1] JP-A-2006-31394

In the system of the patent document 1, the timing of start of transmission of content is mainly controlled by the server and is determined. In this system, when there are plural clients and delivery requests of different groups are received from the plural clients, the server monitors the transmission timing of content for each of the clients, and load is applied to the server. As a method of reducing the load applied to the server, there is a method in which transmission of content is started after a request from the client is issued. According to this method, since the server has only to transmit the content after the request is issued, it is not necessary to monitor the transmission timing for each of the clients, and the load is reduced. However, when the content is continuously reproduced, and when next content is requested after reproduction of content under reproduction is ended, since time is required for the content to reach the client, a silent period occurs from the end of the reproduction of the content under reproduction to the start of the reproduction of the next content. For example, when content is tunes in an album of live performance or an album of classic music, and when the tunes in the album are continuously reproduced, since a sound is produced also during a period between a tune and a tune in the album, when the silent period occurs, unnaturalness is felt.

SUMMARY OF THE INVENTION

The invention has been made in view of the above circumstances, and an object thereof is to make it possible to reproduce content without interruption when plural pieces of content are sequentially reproduced.

In order to solve the problem, according to an aspect of the invention, there is provided a terminal apparatus including transmission means for transmitting a request message, which includes an identifier to identify content and requests the content, to a server apparatus, reception means for receiving encoded content data of plural blocks sequentially transmitted in a streaming format from the server apparatus in response to the request message, reproduction means for reproducing the content by decoding the content data received by the reception means, measurement means for measuring a processing time from a time point when the request message is transmitted to a time point when decoding of the content data in a specified period is ended after reception of the content data transmitted in response to the request message is started, and control means for causing the transmission means to transmit a request message, which requests content to be reproduced next to the content being reproduced by the reproduction means, to the server apparatus at a time earlier than a reproduction end time of the content requested by the request message by at least the processing time.

The control means may cause the transmission means to transmit the request message to the server apparatus at the time earlier than the reproduction end time by at least the processing time and at the time later than a time when decoding of all the content data is completed.

Besides, the control means may be constructed such that when a second processing time from a time point when a request message for content being reproduced by the reproduction means is transmitted to a time point when decoding of content data in a specified period is ended after reception of the content data transmitted in response to the request message is started, is equal to or larger than a first processing time from a time point when a request message for content being reproduced immediately before the content being reproduced by the reproduction means is transmitted to a time point when decoding of content data in a specified period is ended after reception of the content data transmitted in response to the request message is started, the second processing time is made the processing time.

Besides, the control means may be constructed such that when a second processing time from a time point when a request message for content being reproduced by the reproduction means is transmitted to a time point when decoding of content data in a specified period is ended after reception of the content data transmitted in response to the request message is started, is shorter than a first processing time from a time point when a request message for content reproduced immediately before the content being reproduced by the reproduction means is transmitted to a time point when decoding of content data in a specified period is ended after reception of the content data transmitted in response to the request message is started, an average time of the second processing time and the first processing time is made the processing time.

According to the invention, when plural pieces of content are sequentially reproduced, the content is reproduced without interruption.

BRIEF DESCRIPTION OF THE DRAWINGS

FIG. 1 is a view showing the whole structure of a system of an embodiment of the invention.

FIG. 2 is a block diagram showing a hardware structure of a server apparatus 20.

FIG. 3 is a view showing contents of a list stored in the server apparatus 20.

FIG. 4 is a block diagram showing a hardware structure of a terminal apparatus 10.

FIG. 5 is a sequence view for explaining an operation of the embodiment.

FIG. 6 is a view showing contents of a reproduction list generated by the terminal apparatus 10.

FIG. 7 is a view for explaining timings of start of acquisition of content data.

DETAILED DESCRIPTION OF THE INVENTION

Embodiment

FIG. 1 is a view showing the whole structure of a system of an embodiment of the invention. As shown in FIG. 1, in this system, a communication line 30 is connected with a terminal apparatus 10 and a server apparatus 20. Incidentally, in this embodiment, although the communication line 30 is a wired LAN (Local Area Network), the communication line 30 may be a wireless LAN, and the terminal apparatus 10 and the server apparatus 20 may communicate via wireless communication.

The server apparatus 20 is an apparatus functioning as a server in a client-server system. The server apparatus 20 stores content data representing musical compositions. The server apparatus 20 transmits the content data in a streaming format to the terminal apparatus 10. In this embodiment, the format of the content data is MP3 (MPEG Audio Layer-3).

The terminal apparatus 10 is an apparatus that acquires the content data from the server apparatus 20 and reproduces the acquired content data. For example, when the server apparatus 20 is installed in a living room in a house, and the terminal apparatus 10 is installed in each room in the house, the content data can be reproduced in each room and the musical compositions can be heard. In this system, although the server apparatus 20 can communicate with plural terminal apparatuses 10, the one terminal apparatus 10 is shown in the drawing in order to prevent the drawing from becoming complicated.

Structure of the Server Apparatus 20

Figure 2:
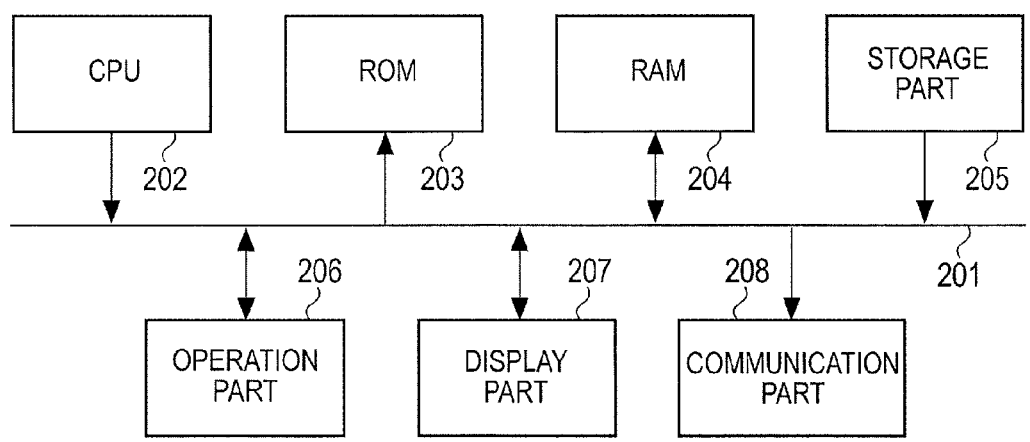

FIG. 2 is a block diagram showing a hardware structure of the server apparatus 20. As shown in FIG. 2, respective parts of the server apparatus 20 are connected to a bus 201, and data is exchanged between the respective parts through the bus 201.

A communication part 208 functions as a communication interface to perform communication through the communication line 30, and performs data communication with other apparatuses. A display part 207 includes a liquid crystal display, and displays various menu screens for operating the server apparatus 20. An operation part 206 includes plural buttons. When a button is operated by an operator of the server apparatus 20, a CPU (Central Processing Unit) 202 performs various processings according to the operated button.

Figures 3, 4:
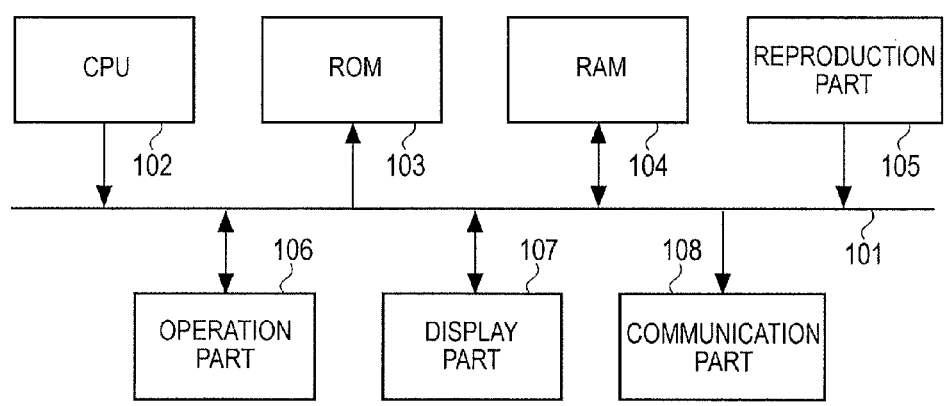

A storage part 205 includes a hard disk device, and stores a server program to realize the function of the server in the client-server system. Besides, the storage part 205 stores plural content data. Besides, the storage part 205 stores a list L of the content data. FIG. 3 is a view showing an example of the list L of the content data. In a column of "file name" of this list L, file names of the content data stored in the storage part 205 are written. Besides, in a column of "title" of the list L, the title of a musical composition represented by the content data specified by the file name in the same row is written. Besides, in a column of "player name●singer name", the player name or the singer name of a musical composition represented by the content data specified by the file name in the same row is written. Besides, in a column of "data size", the size of the content data specified by the file name in the same row is written.

A ROM (Read Only Memory) 203 stores an initial control program. When the power source of the server apparatus 20 is turned on, the CPU 202 reads the initial control program from the ROM 203 and starts it. When the CPU 202 starts the initial control program, the server program stored in the storage part 205 is executed by using a RAM (Random Access Memory) 204, and functions of a computer apparatus and functions of the server in the client-server system, such as a function to control the storage part 205, a communication function to communicate through the communication line 30 and a function to transmit the content data to the terminal apparatus 10, are realized.

Structure of the Terminal Apparatus 10

FIG. 4 is a block diagram showing a hardware structure of the terminal apparatus 10. A communication part 108 functions as a communication interface to communicate through the communication line 30, and performs data communication with other apparatuses. An operation part 106 includes plural buttons for operating the terminal apparatus 10. When a button is operated by the operator of the terminal apparatus 10, a CPU 102 performs various processings according to the operated button. A display part 107 includes a liquid crystal display, and displays various menu screens for operating the terminal apparatus 10 and various messages. A reproduction part 105 includes a speaker (not shown). The reproduction part 105 receives data obtained by encoding the content data, generates an analog signal of a musical composition from the received data, and outputs the generated analog signal to the speaker.

A ROM 103 stores a control program. When the power source of the terminal apparatus 10 is turned on, the CPU 102 reads the control program from the ROM 103 and executes it. When the CPU 102 executes the control program, functions of the computer apparatus and functions of the client in the client-server system, such as a function to communicate through the communication line 30, a function to acquire content data from the server apparatus 20, a timer function to measure a time instant and a time interval, and a function to decode the acquired content data, are realized.

Operation Example

Figure 5:
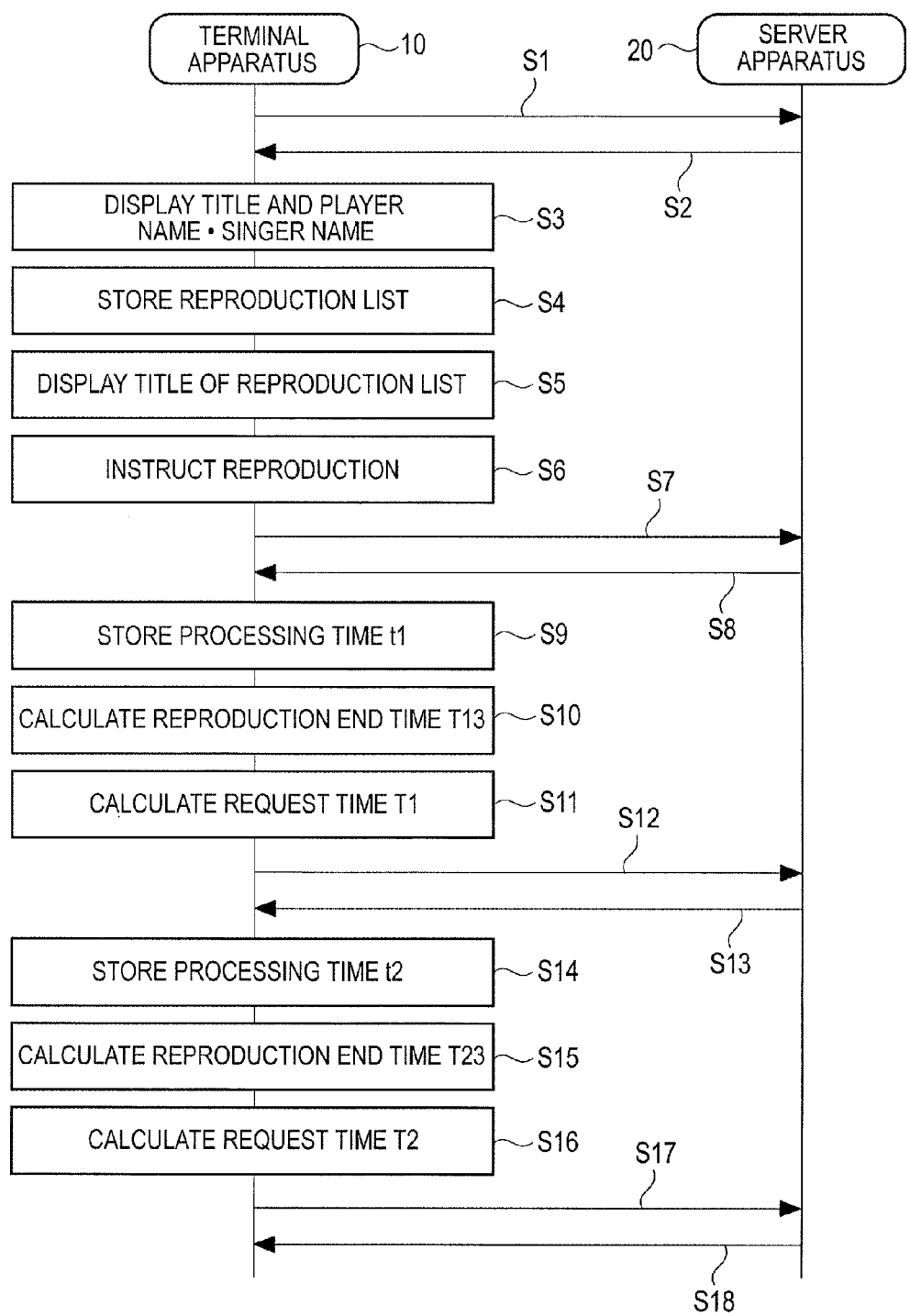

FIG. 5 is a sequence view for explaining an operation of this embodiment. The operation example of the system of the embodiment will be described with reference to FIG. 5. In the following description, first, an operation in which the terminal apparatus 10 selects content data to be reproduced in the terminal apparatus 10 will be described. Next, an operation in which the content data selected by the terminal apparatus 10 is acquired from the server apparatus 20 by the terminal apparatus 10 and is reproduced will be described.

Operation When Content Data is Selected

First, when the user of the terminal apparatus 10 operates the operation part 106 and performs an operation of instructing acquisition of the list L from the server apparatus 20, the CPU 102 controls the communication part 108 and transmits a list request message for requesting the list L to the server apparatus 20 (step S1). The list request message is sent to the server apparatus 20 through the communication line 30, and is received by the communication part 208. When the list request message is received by the communication part 208, the CPU 202 controls the communication part 208 and transmits data stored in the storage part 205 and expressing the list L to the terminal apparatus 10 (step S2).

The data is sent to the terminal apparatus 10 through the communication line 30, and is received by the communication part 108. When the data expressing the list L is received by the communication part 108, the CPU 102 controls the display part 107 based on the received data, and causes the display part 107 to display the contents of the title and the player name●singer name in the list L (step S3). By this, the user of the terminal apparatus 10 can know the titles of the content data stored in the server apparatus 20.

Next, when an operation to select titles of tunes to be reproduced from the displayed titles is performed in the terminal apparatus 10, a list of the selected titles is generated and is stored in the RAM 104 (step S4). For example, when "sample-1", "sample-2" and "sample-4" are selected as the tunes to be reproduced, the selected titles, the file names of the content data relating to the selected tunes, and the data sizes of the content data relating to the selected tunes are extracted from the list L, and a reproduction list (see FIG. 6) in which the extracted file names, titles and data sizes are correlated with each other is stored in the RAM 104. In the reproduction list, the titles are arranged from the first row. The titles are arranged in the order of reproduction of the tunes, and when the tunes are reproduced, the reproduction is performed from the first tune in sequence.

Operation When Content Data is Acquired and Reproduced

Figure 7:
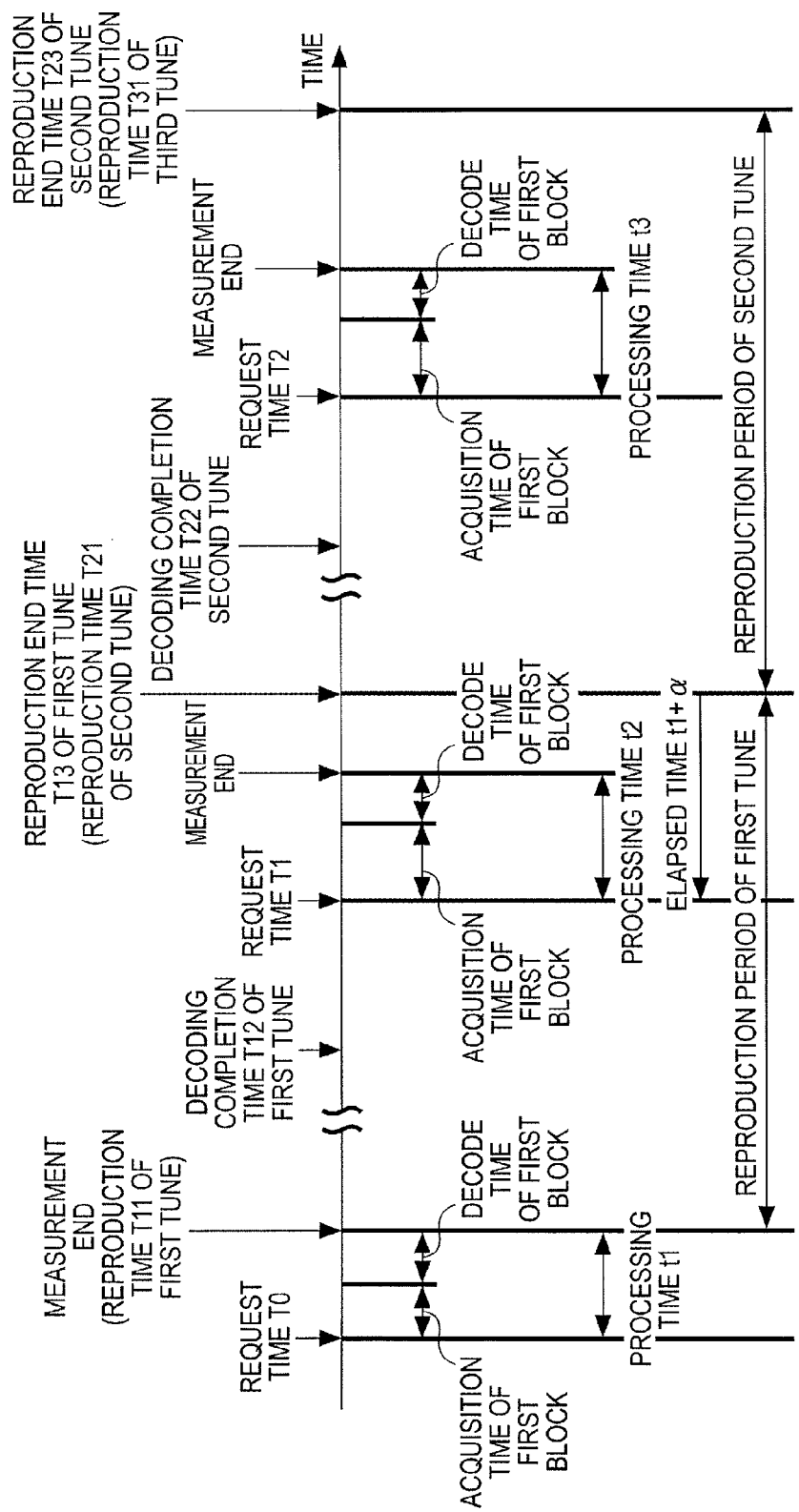

Next, an operation when the tunes selected by the user are reproduced will be described with reference to FIG. 7. When an operation to display the titles of the reproduction list stored in the RAM 104 is performed in the operation part 106, the CPU 102 causes the display part 107 to display the titles in the reproduction list stored in the RAM 104 (step S5). Next, when an operation to instruct the reproduction of the content data of the displayed titles is performed in the operation part 106 (step S6), the CPU 102 acquires the content data of the titles in the reproduction list from the server apparatus 20.

For example, when the contents of the reproduction list are the contents shown in FIG. 6, first, the CPU 102 extracts the file name in the first row of the reproduction list. Next, the CPU 102 controls the communication part 108 and transmits a content request message including the extracted file name and requesting the content to the server apparatus 20 (step S7). Incidentally, here, the CPU 102 starts measurement of an elapsed time from a time point (request time T0) when the content request message is transmitted.

When the content request message including the file name is received by the communication part 208, the CPU 202 reads the content data of the received file name from the storage part 205, divides the read content data into plural blocks, controls the communication part 208 and transmits them in a streaming format to the terminal apparatus 10 (step S8). When the first block of the content data is received by the communication part 108, the CPU 102 starts to decode the received content data. When decoding in a specified period is ended, the measurement of the elapsed time from the time T0 is ended, and the CPU 102 causes the RAM 104 to store a processing time t1 from the request time T0 when the content request message is transmitted to a time point when the decoding of the content data in the specified period is completed (step S9). Incidentally, the specified period here is a period required to decode content data of one block, and is about 100 ms to 1 s.

Thereafter, the content data is continuously transmitted from the server apparatus 20 in the streaming format, is sequentially stored in the RAM 104 and is simultaneously decoded. The CPU 102 sequentially supplies the data obtained by the decoding to the reproduction part 105. The reproduction part 105 generates an analog signal of a musical composition from the supplied data, and outputs the generated analog signal to the speaker (reproduction time T11 of the first tune). Incidentally, the data supplied to the reproduction part 105 is erased from the RAM 104.

The CPU 102 causes the RAM 104 to store the data sequentially transmitted from the server apparatus 20, and determines whether the final block of the content data transmitted in the streaming format is received. Whether the final block of the content data is received can be determined by whether the sum of sizes of the data stored in the RAM 104 from the reception of the first block reaches the data size written in the column of the data size of the reproduction list. For example, in the case of content data of the title "sample-1", when the sum of sizes of data stored in the RAM 104 from the reception of the first block becomes 5 MByte, the CPU 102 determines that the final block of the content data is received. When the CPU 102 determines that the final block of the content data is received, the CPU 102 determines whether all the received content data are decoded. When determining that all the content data are decoded, the CPU 102 ends the decoding process of the content data.

When the decoding is ended, the CPU 102 calculates a reproduction end time T13 of the received final block (step S10). Since a time required to complete the reproduction of data is proportional to the data amount stored in the RAM 104, the reproduction end time T13 of the data can be calculated from the data amount stored in the RAM 104. For example, when n seconds are required from a decoding completion time T12 of the first tune shown in FIG. 7 to the completion of reproduction of the final block, a time after n seconds from the decoding completion time T12 of the first tune becomes the reproduction end time T13 of the first tune.

Next, the CPU 102 uses the processing time t1 stored in the RAM 104 and calculates a request time T1 when a content request message for content data to be next reproduced is transmitted (step S11). Specifically, the CPU 102 calculates, as the request time T1, a time earlier than the reproduction end time T13 of the first tune by the processing time $t1+\alpha$. Here, $\alpha$ is a preliminary time experimentally obtained in advance. Specifically, when the content request message is transmitted at a time earlier than the reproduction end time T13 of the first tune by the processing time t1, if a processing time t2 (described later) relating to the content data of the second tune is longer than the processing time t1, the reproduction of the second tune can not be started at the same time as the reproduction end time T13 of the first tune, and a silent period occurs between the first tune and the second tune. In order to prevent such a disadvantage, the time $\alpha$ is added when the request time T1 is calculated. Incidentally, $\alpha$ is preferably set so that the request time T1 is later than the decoding completion time T12 of the first tune. This is because, when a time from the transmission of the request message for the next tune to the start of the next tune is long, there is a possibility that the user selects a different tune during the period, and in this case, there is a possibility that the requested tune can not be selected, and an erroneous operation occurs. Accordingly, $\alpha$ is preferably as short as possible. Besides, when the request time T1 is calculated, the reproduction end time may not be calculated, and the time when the remaining reproduction time becomes (processing time $t1+\alpha$) may be set to be the request time T1.

Next, the CPU 102 monitors a measured time instant, and determines whether the time instant becomes the request time T1. When the measured time instant becomes the time T1, the CPU 102 extracts a file name of a title to be next reproduced from the reproduction list, and transmits a content request message including the extracted file name to the server apparatus 20 by controlling the communication part 108 (step S12). At the same time, the CPU 102 again starts measurement of an elapsed time from the time point when the content request message is transmitted.

Thereafter, the first block of the content data of the second tune is transmitted from the server apparatus 20 (step S13). When decoding of the first block of the transmitted content data is completed, the CPU 102 ends the measurement of the elapsed time, and causes the RAM 104 to store a processing time t2 from the time point (request time T1) when the content request message is transmitted to a time point when the decoding of the first block of the content data is completed (step S14).

Thereafter, the content data sequentially transmitted from the server apparatus 20 is stored in the RAM 104. The CPU 102 decodes the data stored in the RAM 104, and causes the RAM 104 to store the data obtained by the decoding. As described before, since α is determined so that the processing time t1+α>the processing time t2 is established, as shown in FIG. 7, the time when the decoding of the first block of the content data of the second tune is ended is earlier than the reproduction end time T13 of the first tune.

When the measured time instant becomes the reproduction end time T13 of the first tune, since the data obtained by decoding the content data of the second tune is already stored in the RAM 104, the CPU 102 supplies the data of the second tune stored in the RAM 104 to the reproduction part 105. In the reproduction part 105, since the reproduction of the second tune is immediately started (reproduction start time T21 of the second tune) after the reproduction of the first tune is ended, a silent period does not occur between the first reproduced tune and the tune to be next reproduced, and the musical compositions are continuously reproduced.

The CPU 102 causes the RAM 104 to store the data sequentially transmitted from the server apparatus 20, and also with respect to the second tune, the CPU 102 determines whether the final block of the content data is received. When determining that the final block of the content data is received, the CPU 102 calculates a reproduction end time T23 of the second tune similarly to the first tune (step S15). Besides, with respect to the third content data to be next reproduced, the CPU 102 calculates a request time T1 when a content request message is transmitted (step S16).

Here, when the processing time (processing time stored at step S14) measured on the content data under reproduction is equal to or longer than the processing time (elapsed time stored at step S9) measured on the content data reproduced immediately before, that is, when the processing time t2 of the content data of the second tune is equal to or larger than the processing time t1 of the content data of the first tune, a time earlier than the reproduction end time T23 of the second tune by (processing time t2+α) is made a request time T2 of the third tune. On the other hand, when the processing time t2 of the content data under reproduction is shorter than the processing time t1 of the content data reproduced immediately before, the CPU 102 calculates a time by adding α to an operation result of (processing time t1 of the first tune+processing time t2 of the second tune)/2, and sets a time earlier than the reproduction end time T23 of the second tune by the calculated time to be the request time T2 of the third tune.

Thereafter, similarly to the case where the content data of the second tune is acquired, when the measured time instant becomes the request time T2, the CPU 102 extracts a file name of a title to be next reproduced from the reproduction list, and transmits a content request message including the extracted file name to the server apparatus 20 by controlling the communication part 108 (step S17). When the content data is transmitted from the server apparatus 20 (step S18), the CPU 102 decodes the data transmitted from the server apparatus 20, and causes the RAM 104 to store the data obtained by the decoding.

Thereafter, when the measured time instant becomes the reproduction end time T23 of the second tune, since the data obtained by decoding the content data of the third tune is already stored in the RAM 104, the CPU 102 supplies the data of the third tune stored in the RAM 104 to the reproduction part 105. Here, when the reproduction of the second tune is ended, the data of the third tune is immediately supplied to the reproduction part 105. In the reproduction part 105, since the reproduction of the third tune is immediately started after the reproduction of the second tune is ended, a silent period does not occur in a period between the first reproduced tune and the tune to be next reproduced, and the musical compositions are continuously reproduced. As stated above, since the processing time is measured when each tune is acquired, the change of a network environment and the difference in processing speed of servers can be handled.

MODIFIED EXAMPLE

In the above, although the embodiment of the invention is described, the invention is not limited to the foregoing embodiment, and can be carried out in various other modes. For example, the foregoing embodiment is modified as described below and the invention may be carried out. Incidentally, the foregoing embodiment and the following modified examples may be combined.

In the foregoing embodiment, even when the processing time of the content data under reproduction is shorter than the processing time of the content data reproduced immediately before, the sum of the processing time of the content data under reproduction and α is calculated, and a time earlier than the reproduction end time T of the tune under reproduction by the calculated time may be made the request time of the next tune. Besides, in the foregoing embodiment, all processing times measured each time the request message is transmitted may be stored. Besides, a request time may be calculated by adding α to an average time of all the stored processing times. Besides, when the average time is calculated, instead of calculating the average of all of the sequentially stored processing times, a predetermined number of processing times are extracted in the ascending order of length of the processing time, and the average of the extracted processing times may be calculated. Besides, n (the value of n is set at the time of design) processing times from the newest one in the order of measurement are extracted, and the average of the extracted processing times may be calculated.

In the foregoing embodiment, although the file name is written in the list L, as long as information capable of uniquely identifying content data is written, the file name may not be written. For example, an identifier to uniquely identify content data is generated, and the generated identifier may be written in the list L. In this case, when the terminal apparatus 10 transmits a content request message, the identifier is transmitted to the server apparatus 20, and the server apparatus 20 transmits content data specified by the transmitted identifier to the terminal apparatus 10.

In the foregoing embodiment, although the content data is data representing musical compositions, the content data is not limited to the data representing the musical compositions, and may be data representing moving images, or may include both moving images and musical compositions. Besides, the format of the content data is not limited to MP3, and may be another format. Besides, in the foregoing embodiment, although the communication line 30 is the LAN, the communication line is not limited to the LAN, and may be a WAN (Wide Area Network).

The control program stored in the terminal apparatus 10 is provided in a state where the program is stored in a computer readable recording medium, such as a magnetic recording medium (magnetic tape, magnetic disk (HDD (Hard Disk Drive), FD (Flexible Disk))), an optical recording medium (optical disk (CD (Compact Disk), DVD (Digital Versatile Disk))), a magneto-optical recording medium, or a semiconductor memory, and may be installed in the terminal apparatus 10. Besides, the control program is downloaded through the communication line 30 and may be installed in the terminal apparatus 10.

What is claimed is:

1. A terminal apparatus comprising:
a communication interface configured to transmit a first request message, which includes an identifier to identify content and requests the content, to a server apparatus, and to receive encoded content data of a plurality of blocks sequentially transmitted in a streaming format from the server apparatus in response to the first request message;
a reproduction device configured to reproduce the content by decoding the content data received by the communication interface; and
a control unit configured to
measure an actual processing time from a time when the first request message is transmitted to a time when decoding of the content data in a first period is ended after reception of the content data transmitted in response to the first request message is started; and
control the communication interface to transmit a second request message, which requests content to be reproduced next to the content being reproduced by the reproduction device, to the server apparatus at a time earlier than a reproduction end time of the content requested by the first request message by at least the processing times;
wherein the control unit controls the communication interface to transmit the second request message to the server apparatus at the time earlier than the reproduction end time by at least the processing time and at the time later than a time when decoding of all the content data is completed.

2. The terminal apparatus according to claim 1, wherein when a second processing time from a time point when a second request message for content being reproduced by the reproduction device is transmitted to a time point when decoding of content data in a second period is ended after reception of the content data transmitted in response to the second request message is started, is equal to or larger than a first processing time from a time point when the first request message for content reproduced immediately before the content being reproduced by the reproduction device is transmitted to a time point when decoding of content data in the first period is ended after reception of the content data transmitted in response to the first request message is started, the control unit causes the second processing time to be the processing time.

3. The terminal apparatus according to claim 1, wherein when a second processing time from a time point when a second request message for content being reproduced by the reproduction device is transmitted to a time point when decoding of content data in a second period is ended after reception of the content data transmitted in response to the second request message is started, is shorter than a first processing time from a time point when the first request message for content being reproduced immediately before the content being reproduced by the reproduction device is transmitted to a time point when decoding of content data in the first period is ended after reception of the content data transmitted in response to the first request message is started, the control unit causes an average time of the second processing time and the first processing time to be the processing time.

4. The terminal apparatus according to claim 1, wherein the first period is one block of the content data, and the control unit calculates a request timing after completion of decoding a last block of the encoded content data by calculating the reproduction end time as an end time of reproducing the last block.

* * * * *